United States Patent [19]

Parsons

[11] Patent Number: 5,072,653
[45] Date of Patent: Dec. 17, 1991

[54] PISTON BIASED TO ONE SIDE TO COVER RING GAP

[75] Inventor: Bryan N. V. Parsons, Stoney Station, United Kingdom

[73] Assignee: Jaguar Cars Limited, England

[21] Appl. No.: 378,060

[22] Filed: Jul. 11, 1989

[30] Foreign Application Priority Data

Jul. 16, 1988 [GB] United Kingdom ............... 8816983

[51] Int. Cl.⁵ ........................... F01B 31/00; F16J 1/14
[52] U.S. Cl. ....................................... 92/126; 92/187; 92/238; 123/193 P
[58] Field of Search ............... 123/193 P, 197 AB; 92/126, 172, 187, 238, 261, 162 R; 277/216, 217

[56] References Cited

U.S. PATENT DOCUMENTS

| | | | |
|---|---|---|---|
| 1,699,135 | 1/1929 | Cronin | 277/194 |
| 1,724,193 | 8/1929 | Hackethal | 92/126 |
| 1,847,731 | 3/1932 | Solenberger | 92/126 |
| 1,877,106 | 9/1932 | Williams | 92/126 |
| 1,908,718 | 5/1933 | Williams | 92/126 |
| 1,947,177 | 2/1934 | Timian | 92/126 |
| 2,219,798 | 10/1940 | Wherry | 92/126 |
| 3,859,976 | 1/1975 | McWhorter | 123/197 AB X |
| 4,367,702 | 1/1983 | Lassanske | 123/193 D X |
| 4,848,213 | 7/1989 | Wood et al. | 92/172 |

FOREIGN PATENT DOCUMENTS

| | | | |
|---|---|---|---|
| 0763772 | 3/1954 | Fed. Rep. of Germany | 92/126 |
| 838056 | 2/1939 | France . | |
| 4729612 | 6/1970 | Japan | 123/193 R |
| 21665 | 7/1914 | United Kingdom . | |
| 304519 | 5/1928 | United Kingdom . | |

*Primary Examiner*—Edward K. Look
*Assistant Examiner*—John Ryznic
*Attorney, Agent, or Firm*—Davis, BuJold & Streck

[57] ABSTRACT

A piston for a reciprocating machine includes a split piston ring which is located in a circumferential groove in the cylindrical wall of the piston. The piston is adapted to be located in a cylindrical bore so that the piston ring sealingly engages the bore with a gap between its ends, the gap being fully underlaid and sealed by a contiguous unbroken annular supporting ring, a spring being provided to maintain the ends of the piston ring in engagement with the supporting ring.

6 Claims, 3 Drawing Sheets

PISTON BIASED TO ONE SIDE TO COVER RING GAP

BACKGROUND TO THE INVENTION

The present invention relates to pistons for reciprocating machines for example internal combustion engines or pumps.

In a conventional internal combustion engine one or more pistons are slidingly located in cylinder bores and are sealed with respect thereto by means of piston rings. The piston rings engage in circumferential grooves in the wall of the piston, adjacent the piston head. The rings which are split, are made of resilient metal and in their relaxed state are of greater diameter than the cylinder bore, so that they will engage in the cylinder bore under compression. In order to accommodate manufacturing tolerances and expansion, when engaged in the cylinder bore, a gap remains between the ends of the piston rings.

With such piston rings, a single ring will provide about 95% sealing, the main leakage occurring through the gap between the ends of the ring, a second ring is required to minimize this leakage.

Both piston rings contribute significantly to the frictional forces of the engine. The present invention avoids the need for a second piston ring thus reducing the frictional losses of the engine.

SUMMARY OF THE INVENTION

According to one aspect of the present invention a piston for a reciprocating machine includes a split piston ring which is located in a circumferential groove in the cylindrical wall of the piston, the piston being adapted to be located in a cylindrical bore so that the piston ring sealingly engages the bore with a gap between its ends, said gap being fully underlaid and sealed by a contiguous unbroken annular supporting surface, means being provided to maintain the ends of the piston ring in engagement with the supporting surface.

According to a preferred embodiment of the invention, the supporting surface is provided by a continuous supporting ring which is mounted in the circumferential groove with the piston ring. The supporting ring is however of smaller diameter than the cylinder bore and is lightly biassed into engagement with the cylinder bore where it is engaged by the ends of the piston ring. In this manner, while the cylinder bore will be engaged by a second ring, the resilient load applied therebetween and thus the frictional load will be far less than that of a second piston ring.

According to an alternative embodiment of the invention, the supporting surface may be the lower wall of the circumferential groove, the piston being biassed to one side of the cylinder bore so that the ends of the piston ring are depressed fully into the circumferential groove and the gap is thereby sealed by the underlying wall of the groove. With this embodiment, in order to accommodate thermal expansion, the piston head is asymmetrical and the portion of the wall of the piston which is biassed towards the cylinder wall is relieved towards the top and the bottom of the piston, away from the piston ring. Biassing of the piston to one side of the cylinder bore may be achieved by offsetting the pivotal connection with a connecting rod towards the other side of the cylinder so that gas pressure acting on the piston head will force it into engagement with the piston wall. Alternatively spring means may be used to bias the piston.

In order to maintain the gap of the piston ring in engagement with the supporting surface, the piston ring may be pinned with respect to the piston in order to prevent rotation of the piston ring within the circumferential groove.

BRIEF DESCRIPTION OF THE DRAWINGS

Various embodiments of the invention are now described, by way of example only, with reference to the accompanying drawings, in which.

DESCRIPTION OF A PREFERRED EMBODIMENT

Figure 1:
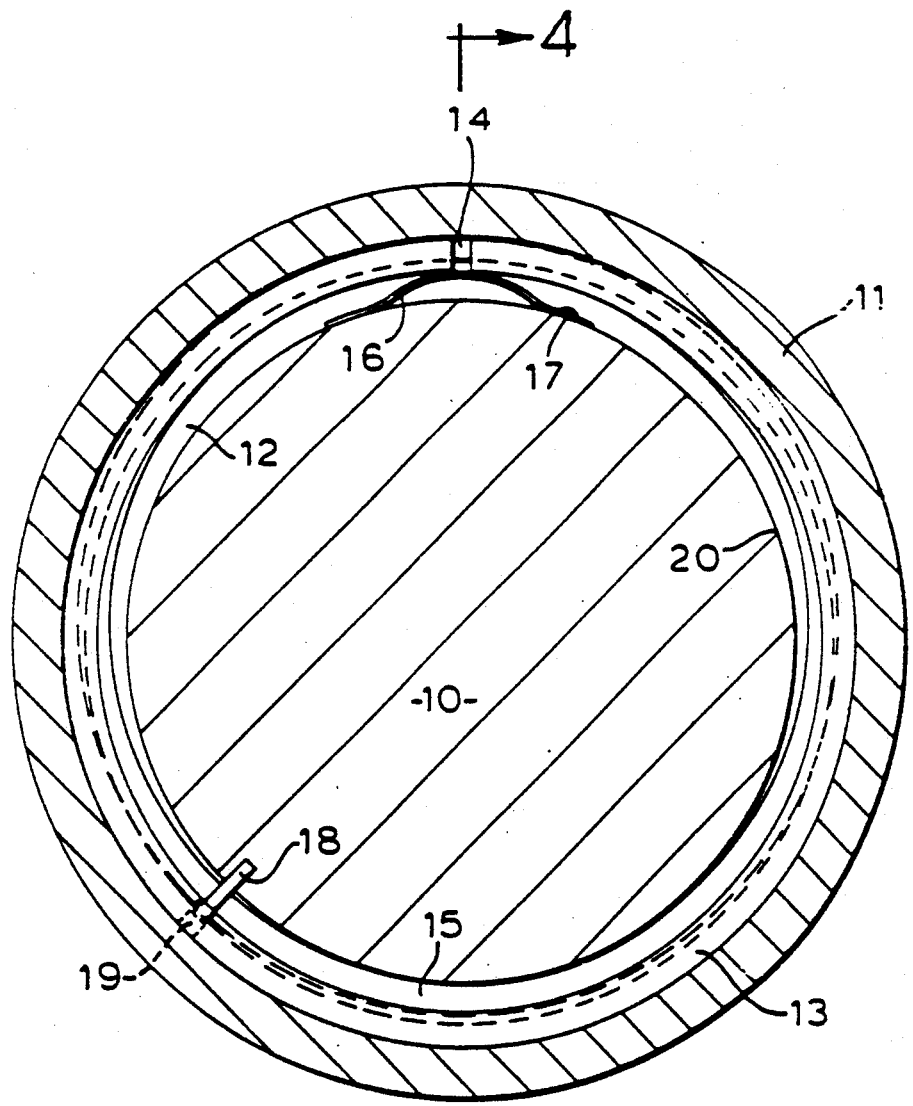
FIG. 1 is a sectional plan view through the head of the piston formed in accordance with the present invention.

As illustrated in FIG. 1, a piston 10 has a circumferential groove 12 in which is located a piston ring 13. The piston 10 is slidingly located in a cylinder 11 so taht the piston ring 13, which is split and made of resilient material engages the bore of cylinder 11 under compression to provide a seal between the piston 10 and cylinder 11.

The piston ring 13 is dimensioned such that when located in sealing engagement with the bore of cylinder 11, a gap 14 remains between the ends thereof. The piston ring 13 is located angularly with respect to the groove 12, by means of a pin 18 which is secured to the piston 10 and extends radially into the groove 12. The pin 18 slidably engages in a bore 19 in the piston ring so as to prevent rotation of the piston ring but permit contraction and expansion of the piston ring 13 radially into and out of the groove 12, to accommodate variations in the bore of the cylinder 11. A continuous supporting ring 15 is located in the groove 12 underneath the piston ring 13. The supporting ring 15 is of smaller diameter than the bore of cylinder 11 but is biassed into engagement with the bore of cylinder 11 by means of a leaf spring 16 which is secured to the piston 10 by means of rivet 17. The spring 16 urges the ring 15 into engagement with the bore of the cylinder 11 where it is engaged by the ends of the piston ring 13, thereby closing the gap 14 and preventing leakage therethrough. Under the pressure of gas in the cylinder, the piston ring 13 will be forced down on to the supporting ring 15 to provide a seal therebetween and prevent leakage of any gas which passes through the gap 14 to the gap between the cylindrical wall 20 of the groove 12 and the piston ring 13.

The supporting ring 15 of the present invention thereby prevents all leakage of gases through the gap 14 thus removing the need for a second piston ring.

Figure 2:
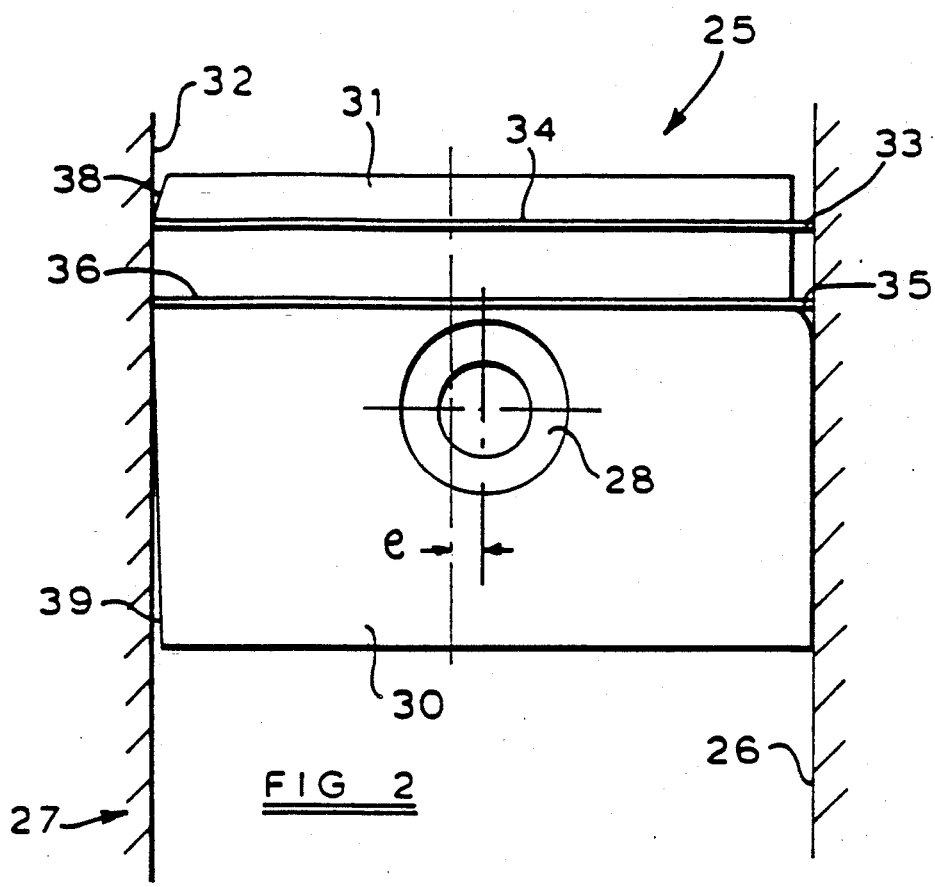
FIG. 2 is a side elevation of an alternative piston formed in accordance with the present invention.
Figure 3:
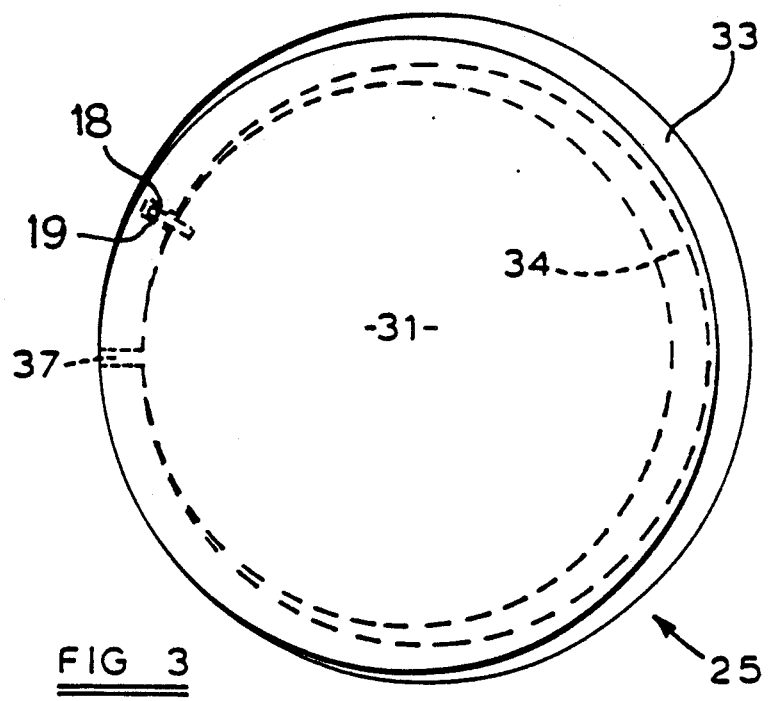
FIG. 3 is a plan view of the piston illustrated in FIG. 2.
Figure 4:
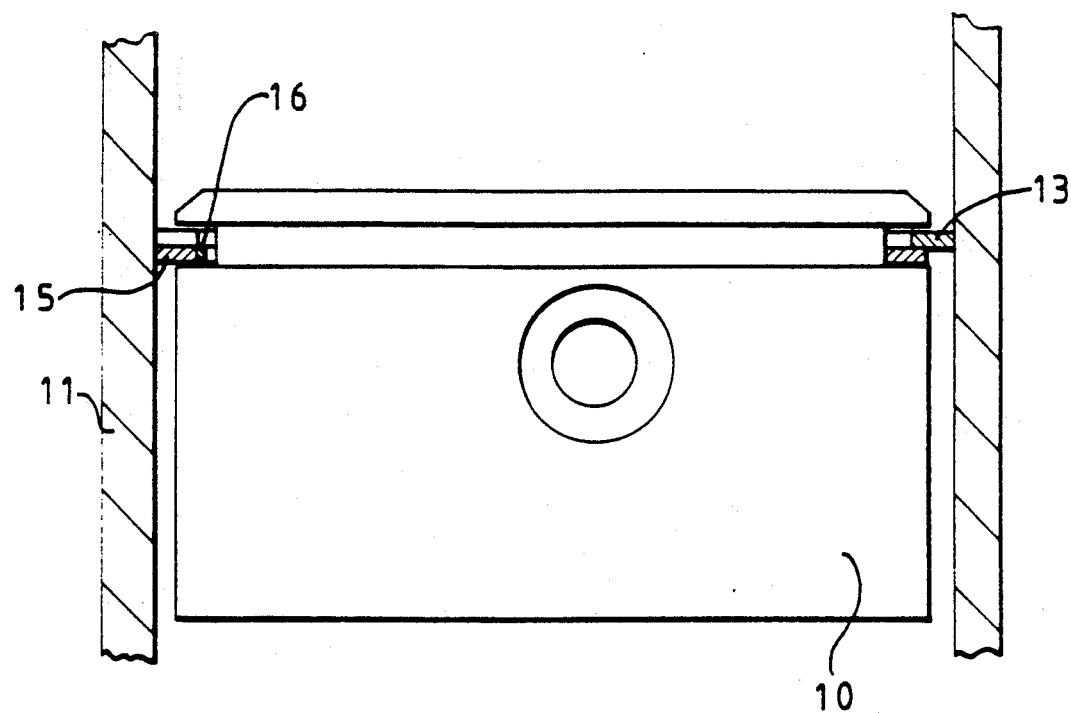
FIG. 4 is partial cross sectional view along section line 4—4 of FIG. 1 in which the cylinder wall and the rings are shown in section and the piston is shown in plan.

In the embodiment illustrated in FIGS. 2 and 3, a piston 25 is slidingly located in the bore 26 of cylinder 27. The piston 25 is pivotally connected to a connecting rod (not shown) by a gudgeon pin 28, the connecting rod being connected to a crank shaft in known manner.

The skirt portion 30 of piston 25 is a sliding fit within the bore 26. In order to accommodate expansion of the head portion 31 of the piston 25, it is of reduced diameter, but is asymmetrical of the skirt portion 30, so that it will engage the bore 26 of cylinder 27 at one side 32. Piston ring 33 is located within a circumferential groove 34 adjacent the top of the head portion 31 and an oil ring 35 is located in a second circumferential groove 36 adjacent the top of the skirt portion 30.

Piston ring 33 is pinned, in a similar manner to that described with reference to FIG. 1, so that it is located angularly and the gap 37 in the piston ring 33 will be located against side 32 of the bore 26. The ends of the piston ring 33 will thus be fully compressed into the groove 34, so that gap 37 will be closed by the lower wall of groove 34 and leakage therethrough will be minimised.

In order to permit slight tilting of the piston 25 upon expansion of the head portion 31, the areas 38 and 39 of the head portion 31 and skirt portion 30 that engage side 32 of bore 26 are relieved away from the piston ring 33.

The axis of the gudgeon pin 28, which is transverse to the diameter through the point of contact with side 32 of bore 26, is offset (e) from the centre of the piston 25, away from side 32, so that gas pressure acting on the piston head 31 will tilt the piston 25 and urge it into engagement with the bore 26 on side 32 of the cylinder 27.

Various modifications may be made without departing from the invention. For example, in the embodiment illustrated in FIG. 1, the spring means 16 may be replaced by a helical compression spring which is located in a radial bore in the piston 10. Alternatively, one or more leaf spring elements may be secured to the supporting ring 15 or formed integrally thereof. Furthermore, rather than providing a bore 19 in the piston ring for engagement of pin 18 to prevent rotation of the piston ring 13 relative to piston 10, the ends of the piston ring 13 which define gap 14 may be recessed on the inner diameter of the ring 13, and a pin may be provided to engage in this recess to prevent rotation of the ring 13 while permitting variation in the width of the gap 14.

In the embodiment illustrated in FIGS. 2 and 3, biasing of the piston into engagement with side 32 of the bore 26 may alternatively be achieved by resilient means acting between the piston and connecting rod.

I claim:

1. A piston for a reciprocating machine including a split piston ring which is located in a circumferential groove in the cylindrical wall of the piston, the piston being adapted to be located in a cylindrical bore so that the piston ring sealingly engages the bore with a gap between its ends, said gap being fully underlaid and sealed by a contiguous unbroken annular supporting surface, means being provided to maintain the ends of the piston ring in fully underlaid engagement with the supporting surface, and means to bias the piston towards one side of the cylinder bore on both the upstroke and downstroke of the piston, the gap and the piston ring being located against one side of the cylinder bore so that it is compressed fully into the circumferential groove and is sealed by engagement with a wall defining the circumferential groove.

2. A piston for a reciprocating machine including a split piston ring which is located in a circumferential groove in the cylindrical wall of the piston, the piston being adapted to be located in a cylindrical bore so that the piston ring sealingly engages the bore with a gap between its ends, said gap being fully underlaid and sealed by a contiguous unbroken annular supporting surface, means being provided to maintain the ends of the piston ring in fully underlaid engagement with the supporting surface, and means for biasing the piston towards one side of the cylinder bore on both the upstroke and downstroke of the piston, the gap and the piston ring being located against one side of the cylinder bore so that it is compressed fully into the circumferential groove and is sealed by engagement with a wall defining the circumferential groove, wherein the piston includes a head portion and a skirt portion, the head portion is of reduced diameter and is formed asymmetrically of the skirt portion, in order to accommodate thermal expansion of the head portion.

3. A piston according to claim 2 in which the head and skirt portions of the piston are relieved away from the piston ring in order to accommodate slight tilting of the piston upon expansion of the head portion.

4. A piston for a reciprocating machine including a split piston ring which is located in a circumferential groove in the cylindrical wall of the piston, the piston being adapted to be located in a cylindrical bore so that the piston ring sealingly engages the bore with a gap between its ends, said gap being fully underlaid and sealed by a contiguous unbroken annular supporting surface, means being provided to maintain the ends of the piston ring in fully underlaid engagement with the supporting surface, and means for biasing the piston towards one side of the cylinder bore on both the upstroke and downstroke of the piston, the gap and the piston ring being located against one side of the cylinder bore so that it is compressed fully into the circumferential groove and is sealed by engagement with a wall defining the circumferential groove, wherein a pivotal connection is provided between the piston and a connecting rod, said pivotal connection being offset away from said one side of the cylindrical bore, so that gas pressure acting on the piston will bias the piston towards said one side of the cylindrical bore.

5. A piston according to claim 1 in which means is provided to prevent rotation of the piston ring relative to the cylindrical bore.

6. A piston according to claim 5 in which a pin extends radially from the piston within the circumferential groove and engages a formation on the piston ring to prevent rotation thereof, while permitting compression and expansion of the piston ring into and out of the circumferential groove.

* * * * *